United States Patent
Kim et al.

(10) Patent No.: US 10,362,005 B2
(45) Date of Patent: Jul. 23, 2019

(54) ELECTRONIC DEVICE, COMMUNICATION METHOD AND ENCRYPTING METHOD THEREOF

(71) Applicant: SAMSUNG ELECTRONICS CO., LTD., Suwon-si, Gyeonggi-do (KR)

(72) Inventors: Sung-Wook Kim, Seoul (KR); Chul-joo Kim, Suwon-si (KR); Young-chul Sohn, Seoul (KR); Jun-bum Shin, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 180 days.

(21) Appl. No.: 15/398,238

(22) Filed: Jan. 4, 2017

(65) Prior Publication Data
US 2017/0201492 A1   Jul. 13, 2017

(30) Foreign Application Priority Data
Jan. 13, 2016   (KR) .......................... 10-2016-0004265

(51) Int. Cl.
| | |
|---|---|
| *H04L 29/06* | (2006.01) |
| *H04L 9/14* | (2006.01) |
| *H04W 12/04* | (2009.01) |
| *H04W 12/02* | (2009.01) |
| *H04W 4/70* | (2018.01) |
| *H04W 84/18* | (2009.01) |

(52) U.S. Cl.
CPC .............. *H04L 63/045* (2013.01); *H04L 9/14* (2013.01); *H04L 63/06* (2013.01); *H04W 4/70* (2018.02); *H04W 12/02* (2013.01); *H04W 12/04* (2013.01); *H04L 2209/80* (2013.01); *H04W 84/18* (2013.01)

(58) Field of Classification Search
CPC . G06F 21/72; H04L 9/14; H04L 63/06; H04L 63/045; H04W 4/70; H04W 12/02; H04W 12/04
USPC ............................................. 713/189; 380/28
See application file for complete search history.

(56) References Cited

U.S. PATENT DOCUMENTS 5,995,623 A * 11/1999 Kawano .................. G06F 21/10
                                                                          380/277
6,031,634 A    2/2000 Shimada et al.
(Continued)

FOREIGN PATENT DOCUMENTS

| JP | 2007-081521 | 3/2007 |
|---|---|---|
| JP | 2008-066834 | 3/2008 |

(Continued)

*Primary Examiner* — Hosuk Song
(74) *Attorney, Agent, or Firm* — Nixon & Vanderhye P.C.

(57) ABSTRACT

An electronic device is disclosed. The electronic device which is included in a home network, the device includes a sensor, a communicator comprising communication circuitry configured to communicate with an external device which is included in the home network, and a processor configured to control the communication circuitry, to encrypt first data which is initially acquired from the sensor with a first encryption algorithm and transmit the encrypted standard data to the external device, determine third data based on the first data and a second data in response to the second data being acquired from the sensor after the first data is acquired, to encrypt the third data with a second encryption algorithm and to transmit the encrypted third data to the external device.

17 Claims, 7 Drawing Sheets

1000

(56) References Cited

U.S. PATENT DOCUMENTS

| | | | |
|---|---|---|---|
| 8,601,267 B2* | 12/2013 | Lucidarme | H04L 9/0825 380/28 |
| 8,687,810 B2* | 4/2014 | Bukshpun | H04L 9/0838 380/263 |
| 9,118,464 B2* | 8/2015 | Nix | H04W 4/70 |
| 9,413,529 B2* | 8/2016 | Resch | H04L 9/0822 |
| 2002/0191610 A1 | 12/2002 | Baek et al. | |
| 2009/0175444 A1 | 7/2009 | Douglis et al. | |
| 2013/0054959 A1 | 2/2013 | Lescuyer et al. | |
| 2013/0311765 A1 | 11/2013 | Obinata et al. | |
| 2016/0197892 A1 | 7/2016 | Teruyama | |

FOREIGN PATENT DOCUMENTS

| | | |
|---|---|---|
| JP | 2013-239989 | 11/2013 |
| KR | 10-0198168 | 6/1999 |
| KR | 10-2002-0096172 | 12/2002 |
| KR | 10-1053636 | 8/2011 |

\* cited by examiner

ELECTRONIC DEVICE, COMMUNICATION METHOD AND ENCRYPTING METHOD THEREOF

CROSS-REFERENCE TO RELATED APPLICATION

This application is based on and claims priority under 35 U.S.C. § 119 to Korean Patent Application No. 10-2016-0004265, filed in the Korean Intellectual Property Office on Jan. 13, 2016, the disclosure of which is incorporated by reference herein in its entirety.

BACKGROUND

1. Field

The present disclosure relates generally to an electronic device, a communication method and an encrypting method thereof, and for example, to an electronic device which reduces the consumption of resources by applying at least two encryption algorithms that have different computation/security levels, a communication method and an encrypting method thereof.

2. Description of Related Art

In network communication, network security is important. A flow of information that can be acquired without any restriction regarding time and place is always exposed to a danger of extortion by a third party.

Meanwhile, quickly expanded communication technology such as IoT technology deeply came into private parts of individuals' lives and such technology provides much convenience and comfortable life styles.

According to some purposes, communication devices used in the IoT can perform wireless communication, be power-supplied by using batteries and be produced in small sizes to ensure a convenient installation, use convenience and portability.

However, these communication devices have limited resources such as limits on processor's performance and power.

An existing resource-poor device including limited resources does not encrypt data or encrypts data with an encryption algorithm when exchanging information with another device. Encrypting information for security is a big burden to a device that has few resources.

SUMMARY

The disclosure is provided for improvements in the above described technical aspects and devices and methods consistent with example embodiments relate to an electronic device which reduces the consumption of resources by applying at least two encryption algorithms that have different computation security levels, a communication method and an encrypting method thereof.

According to an example embodiment, an electronic device which is included a home network is provided, the device including: a sensor; a communicator comprising communication circuitry configured to communicate with an external device included in the home network; and a processor configured to control the communication circuitry to receive first data from the sensor, to encrypt first data which is initially acquired from the sensor with a first encryption algorithm and to transmit the encrypted standard data to the external device, to determine third data based on the first data and second data in response to the second data being acquired from the sensor after the first data is acquired, to encrypt the third data with a second encryption algorithm and to transmit the encrypted third data to the external device.

The second encryption algorithm may require less computation to encrypt certain data than the first algorithm.

The processor, in response to communicating with the external device using wireless communication, may set a session for the wireless communication with the external device, share a plurality of encryption keys to be used until the set session ends, encrypt the first data by using any one of the plurality of encryption keys, and encrypt the third data by using another key among the plurality of encryption keys.

The first encryption algorithm may be a block encryption algorithm using an encryption key that is shared through the session and the second encryption algorithm may be a stream encryption algorithm using an encryption key that is shared through the session.

The first encryption algorithm may be an asymmetric key encryption algorithm using a public key that is shared through the session and the second encryption algorithm may be a symmetric key encryption algorithm using a secret key that is shared through the session.

The processor may encrypt the third data that indicates a difference between the first data and the second data with the second encryption algorithm.

The processor, in response to the first data and the second data not being identical, may encrypt the third data that indicates that the first data and the second data are not identical with the second encryption algorithm.

According to an aspect of another example embodiment, a communication method of an electronic device which included in a home network is provided, the method including: encrypting first data initially acquired from a sensor with a first encryption algorithm; transmitting the encrypted standard data to an external device that is included in the home network; determining third data based on the first data and second data in response to second data being acquired from the sensor aft the first data is acquired; encrypting the third data with a second encryption algorithm; and transmitting the encrypted third data to the external device.

The second encryption algorithm may require less computation to encrypt certain data than the first algorithm.

The method may further include: setting a session for wireless communication with the external device; and sharing a plurality of encryption keys to be used until the set session ends, wherein the encrypting with the first encryption algorithm comprises encrypting the first data using any one of the plurality of encryption keys, and wherein the encrypting with the second encryption algorithm comprises encrypting the third data by using another key among the plurality of encryption keys.

The first encryption algorithm may be a block encryption algorithm using an encryption key that is shared through the session, and the second encryption algorithm may generate a pseudorandom number by using an encryption key that is shared through the session as a seed value and may be a stream encryption algorithm using the generated pseudorandom number.

The first encryption algorithm may be an asymmetric key encryption algorithm using a public key that is shared through the session, and the second encryption algorithm may be a symmetric key encryption algorithm using a secret key that is shared through the session.

The determining the third data may include determining the third data that indicates a difference between the first data and the second data.

The determining the third data may include, in response to the first data and the second data not being identical, determining the third data that indicates that the first data and the second data are not identical.

According to an aspect of another example embodiment, an encrypting is provided, the method including: encrypting first information using a first encryption algorithm; and encrypting second information that is determined based on the first information using a second encryption algorithm of which a security level is different from a security level of the first encryption algorithm.

The second information may be a result of differentiation between the first information and information acquired later than the first information.

The second encryption algorithm may require less computation to encrypt certain data than the first algorithm.

According to the various example embodiments, the following effects may be obtained.

According to an example embodiment, a device may attain a high security level and low power consumption with few resources.

According to another example embodiment, the device may transmit information encrypted for a long operating time in real time.

BRIEF DESCRIPTION OF THE DRAWINGS

The above and other aspects, features and attendant advantages of the present disclosure may be more readily appreciated and understood from the following detailed description, taken in conjunction with the accompanying drawings, in which like reference numerals refer to like elements, and wherein.

DETAILED DESCRIPTION

Various example embodiments will be described in greater detail below with reference to the accompanying drawings. In describing example embodiments, detailed description of relevant known functions or components may be omitted if it would obscure the description of the subject matter. Terms used hereinafter are terms defined by functions of the disclosure being considered, and definitions may vary according to a user, an operator or a custom. Therefore, definitions of the terms should be made with reference to overall contents of the disclosure.

The terms used in the present application are only used to describe the example embodiments, but are not intended to limit the scope of the disclosure. The singular expression also includes the plural meaning as long as it does not conflict in context. In the present application, the terms "include" and "consist of" designate the presence of features, numbers, steps, operations, components, elements, or a combination thereof that are written in the disclosure, but do not exclude the presence or possibility of addition of one or more other features, numbers, steps, operations, components, elements, or a combination thereof.

In the example embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, the present disclosure will be described in greater detail with reference to the accompanying drawings.

Figure 1:
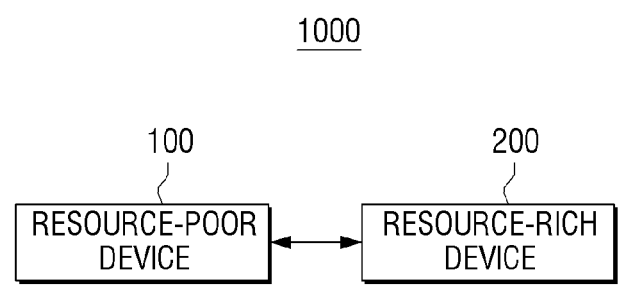
FIG. 1 is a block diagram illustrating an example communication system according to an example embodiment.

FIG. 1 is a block diagram illustrating an example communication system according to an example embodiment.

FIG. 1 illustrates that a communication system 1000 includes a resource-poor device 100 and a resource-rich device 200.

The resource-poor device 100 may refer, for example, to a device that has respectively fewer resources than the resource-rich device 200. The resource-poor device 100 may be provided with limited power supply, and may have a lower capacity memory and lower processing performance than the resource-rich device 200. For example, the resource-poor device 100 may be a device that includes respectively fewer resources to ensure mobility and to lower producing cost. The resource-poor device 100 should perform its all functions with limited resources.

The resource-rich device 200 may refer, for example, to a device that has relatively more resources than the resource-poor device 100 and the resource-rich device 200 refers to all devices such as a workstation, a smartphone, a home server of a home network, a network repeater and the like that can embody the communication system 1000 without a limit in respects of performance and power.

Meanwhile, the resource-poor device 100 communicates with the resource-rich device 200. The resource-poor device 100 consumes resources for communication. Herein, the resource-poor device 100 encrypts and decrypts data that is exchanged in communication. Power to be consumed and computation for encrypting and decrypting data are big burden to the resource-poor device 100.

Even though a heavy and complex encryption can attain a high level of security, since it takes a long time for the resource-poor device 100 to encrypt and decrypt data, a responding speed is slowed and since the resource-poor device 100 quickly consumes power of the battery, an operating time is reduced. For example, even though few times of communication may not be a burden to the resource-poor device 100, if communication is carried out repetitively and periodically, a function deterioration by a heavyweight encryption would be the result that cannot be ignored.

Therefore, the resource-poor device 100 communicates with the resource-rich device 200 using a simple and lightweight encryption algorithm. Also, the resource-poor device 100 may use a plurality of encryption algorithms and encrypt data to be transmitted by using an encryption algorithm that has different computation based on a kind of the data to be transmitted. Hereinafter, an encryption algorithm with heavy computation is referred to as a heavyweight encryption algorithm and an encryption algorithm with light computation is referred to as a lightweight encryption algorithm.

Figure 2:
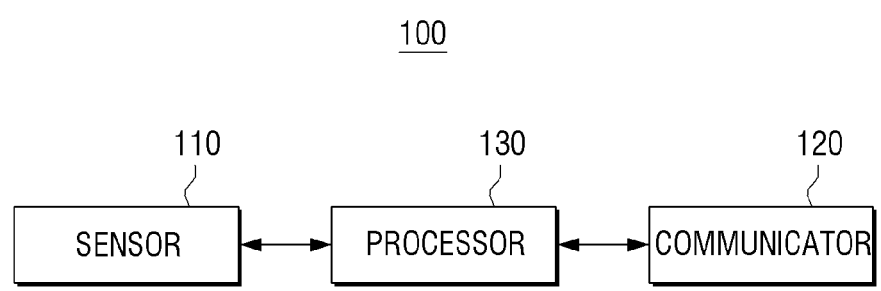
FIG. 2 is a block diagram illustrating an example configuration of an electronic device according to an example embodiment.

FIG. 2 is a block diagram illustrating an example configuration of an electronic device according to an example embodiment.

The electronic device 100 corresponds to the resource-poor device 100 of the communication system 1000 in FIG. 1. FIG. 2 illustrates that the electronic device 100 includes a sensor 110, a communicator (e.g., including communication circuitry) 120 and a processor 130.

The sensor 110 may refer, for example, to an element that senses information that is measurable and acquirable. For example, the sensor 110 may be all forms of devices to acquire necessary information from a subject object. For example, the sensor 110 may be any one of a touch detecting sensor, a pressure sensor, a vibration sensor, an electric current sensor, a static electricity detecting sensor, an optical electric sensor used in a camera, an acceleration sensor, a terrestrial magnetism sensor, a gravity sensor, a temperature sensor, a humidity sensor and an odorant sensor, or the like, but is not limited thereto.

The communicator 120 may include various communication circuitry that communicates with an external device. For example, the communicator 120 may communicate with the external device that is included in a home network.

The home network may refer, for example, to a local area network (LAN) that is in a small scale. The home network is a network that is configured for communication among devices in a home that is a residential space of a user and as kinds of device that supports IoT increase, applicability thereof is also becoming more diverse. The home network may be configured for devices to be connected directly to each other or configured in a center-integrated system in which one device controlling entire home network is connected with all other devices.

The communicator 120 may include various communication circuitry configured to support both wired communication and wireless communication. For example, the communicator 120 may include a serial port that can be connected with one connector pin or a plurality of connector pins. The communicator 120 may include an antenna and a wireless controller that supports various wireless communication methods. For example, the communicator 120 may communicate in at least one method among Wi-Fi, Bluetooth, Zigbee, Wibro and a wireless mobile communication. Herein, the communicator 120 may be embodied as Bluetooth Low Energy (BLE) that is for low power consumption.

The processor 130 may include various processing circuitry that controls each element of the electronic device 100. For example, the processor 130 may control all elements to acquire information through the sensor 110, encrypt the acquired information and transmit the encrypted information to an external device through the communicator 120.

The processor 130 may control the communicator 120 for wireless communication. Herein, the processor 130 may set a session for wireless communication with the external device.

The processor 130 acquires data from the sensor 110. Specifically, the processor 130 may acquire data that indicates information sensed from the sensor 110. For example, the sensor 110 may output an electric signal corresponding to a sensed input, and the processor 130 may digitalize the output electric signal according to a type of the sensor 110 and a specification that is pre-set with respect to the sensor 110 and acquire data that indicates the sensed information.

The processor 130 acquires a plurality of pieces of data. For example, the processor 130 may acquire a plurality of pieces of data which are sequentially sensed by the sensor 110 at different times.

When second data is acquired after first data is initially acquired, third data is determined based on the first data and the second data. Herein, the third data may be determined in various methods.

For example, the third data may be the result determined by a certain formula having the first data and the second data as elements. The second data may be restored from the third data based on the first data. In the simplest method, the third data may be the result of differentiation between the second data and the first data. The third data may indicate an amount how much the second data is increased or decreased from the first data.

For another example, the third data may indicate a toggle signal. For example, the processor 130 may determine third data indicating that information of second data differs from information of first data. The electronic device 100 and the external device have already acknowledged that information acquired from the sensor 110 is one of a plurality of numbers of cases and the plurality of numbers of cases are sequentially converted. After initially acquired first data is transmitted, if information indicated by acquired second data differs from an initial case, the electronic device 100 may transmit third data, namely a toggle signal that instructs the external device to convert from the plurality of numbers of cases to a plurality of numbers of cases of the next order.

For another example embodiment, the third data may be data compressed based on the first data that is prior to a second data. If acquired data is a video or an audio, the processor 130 may use a codec for compression. A receiving side may play the second data based on the first data with respect to the third data that is received after the first is acquired.

The processor 130 encrypts the acquired data according to an encryption algorithm. Herein, the processor 130 encrypts data with different encryption algorithms according to a type of acquired data. For example, the processor 130 may encrypt initially acquired first data according to a first encryption algorithm and based on second data acquired after the first data is encrypted, encrypt third data that is determined according to a second encryption algorithm.

Herein, the second encryption algorithm that is used to encrypt the third data may require less computation than the first encryption algorithm in encrypting certain data. In other words, the processor 130 may encrypt data with the second encryption algorithm more easily than with the first algorithm. For example, the second encryption algorithm may be an algorithm by which a simpler arithmetic operation is performed and fewer sequential processes are proceeded than the first encryption algorithm. A size of an encryption key that is used for encryption according to the second encryption algorithm may be smaller than an encryption key used for encryption according to the first encryption algorithm.

Meanwhile, regarding network security, the more complex an encrypting method is and the bigger a size of an encryption is, the higher a security level is. Based on this, a security level of the lightweight second encryption algorithm may be lower than a security level of the first encryption algorithm.

However, the third data that is encrypted according to the second encryption algorithm itself is not important and the second data that has entire meaning can be acquired only when the first data is acknowledged and thus, a confidentiality level of the third data is lower than the confidentiality level of the first data. Therefore, even though the third data is encrypted with a lightweight encryption algorithm, a security level of an entire communication system may be maintained highly.

A plurality of encryption algorithms may be the algorithms of various methods and have different computation. For example, a first encryption algorithm and a second encryption algorithm may be symmetric key algorithms for which an identical encryption key is used to encrypt and decrypt data but a size of the used symmetric key in encrypting data may different from a size of the used symmetric key in decrypting the data.

For another example embodiment, the first encryption algorithm may be a block encryption algorithm that is encrypting data using an encryption key in a certain block unit with respect to the initially transmitted first data and the second encryption algorithm may be a stream encryption algorithm that determines a bit string with respect to the third data that is sequentially transmitted later. Herein, a secret key required for a stream encryption may be provided to the electronic device 100 by an external device that has many resources generating a pseudorandom number. The block algorithm may be DES, AES, Blowfish, RC5 or the like. The stream encryption algorithm may be a stream operation mode of a block encryption, RC4, ChaCha or the like.

For another example, the first encryption algorithm may be an asymmetric encryption algorithm that uses a public key of which size is very big and that is published by an external device with many resources, and the second encryption algorithm may be a symmetric encryption algorithm of which secret keys are exchanged according to a key exchange method of Deffie-Hellman.

The processor 130 may include various processing circuitry. For example, the processor 130 may be embodied as at least one of a dedicated processor, a CPU, an application specific integrated circuit (ASIC), an embedded processor, a microprocessor, a hardware control logic, a hardware finite state machine (FSM) and a digital signal processor (DSP), or the like, but is not limited thereto. Even though it is not illustrated, the processor 130 may further include an interface such as a bus to communicate with each element.

The electronic device 100 maintains a security level of an entire communication highly with few resources, has high performance and attains low power consumption.

Figure 3:
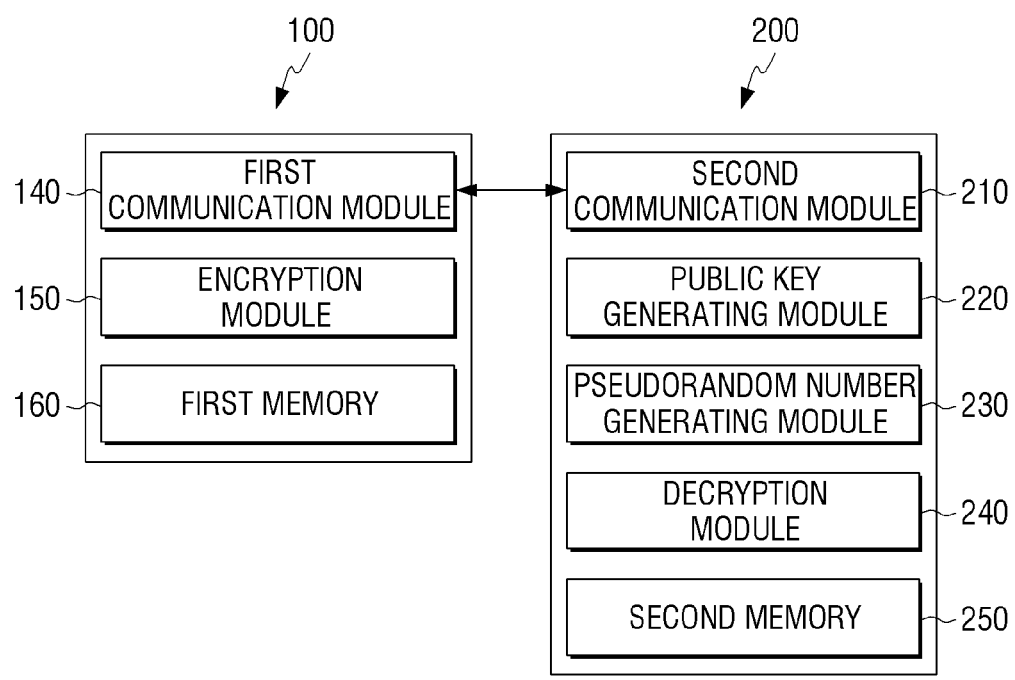
FIG. 3 is a block diagram illustrating an example of functional modules of each element of the communication system of FIG. 1.

FIG. 3 is a block diagram illustrating an example of functional modules of each element of the communication system of FIG. 1.

Referring to FIG. 3, the electronic device 100 communicates with the external device 200. Herein, the electronic device 100 corresponds to the resource-poor device 100 of FIG. 1 and the external device 200 corresponds to the resource-rich device 200 of FIG. 1. The electronic device 100 and the external device 200 respectively include a first communication module 140 and a second communication module 210 for wireless communication, each of the first and second communication modules may include various communication circuitry for achieving wireless communication.

An encryption module 150 encrypts data according to a plurality of encryption algorithms by using different encryption keys. A first memory 160 stores a plurality of encryption keys received through the first communication module 140, a plurality of data pieces to be encrypted and a program in which a plurality of encryption algorithms for encryption are embodied.

A public key generating module 220 generates a public key to encrypt data according to an asymmetric encryption algorithm. A pseudorandom number generating module 230 generates a pseudorandom number to generate various encryption keys.

A decryption module 240 decrypts encrypted data that is received from the electronic device 100 correspondingly to the encryption module 150. A second memory 250 stores encrypted data, a secret key for an encryption, a generated public key, a pseudorandom number and a program in which an encryption algorithm corresponding to a plurality of encryption algorithms is embodied.

The second communication module 210 transmits a plurality of encryption keys that the external device 200 generated.

The encryption module 150 encrypts initial first data that is stored in the first memory 160 as a first encryption key according to a first encryption algorithm. The first communication module 140 transmits the encrypted first data.

The encryption module 150 encrypts pieces of data acquired after the first data is acquired as a second encryption key according to a second encryption algorithm. The first communication module 140 sequentially transmits the following encrypted data.

FIG. 3 illustrates an asymmetric key algorithm that uses a public key for encrypting data and a secret key for decrypting the data and a symmetric key algorithm that uses a generated pseudorandom number for an encryption and a decryption but it is not limited thereto.

For example, the electronic device 100 may encrypt data using different symmetric keys for an identical encryption algorithm. Also, the electronic device 100 may encrypt data in different operation modes of an identical block encryption.

Also, all the keys are explained as content encryption keys (CEKs) for encrypting data but it is not limited thereto. A plurality of keys for an encryption may include a key for encrypting another key. In addition, the key encryption key (KEK) which is for encrypting another key may require computation much lesser than another key in encrypting a key.

Figure 4:
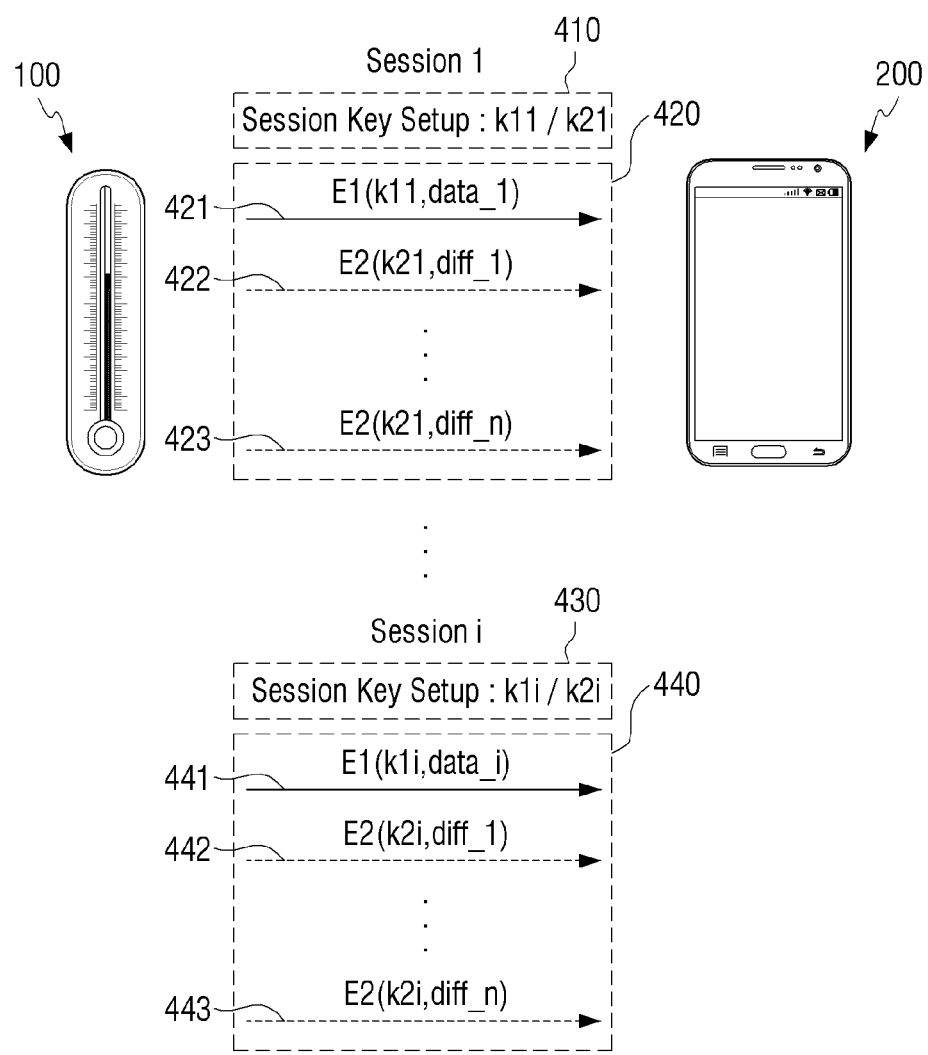
FIG. 4 is a diagram illustrating an example wireless communication method according to an example embodiment of the communication system of FIG. 1.

FIG. 4 is a diagram illustrating an example wireless communication method according to an example embodiment of the communication system of FIG. 1.

Referring to FIG. 4, the electronic device 100 that has few resources may, for example, be a thermometer. The thermometer measures a temperature and transmits data regarding the measured temperature to a smartphone 200 that has many resources.

The thermometer 100 sets temporary sessions (Session 1, . . . , Session i) for wireless communication with the smartphone 200. When one session ends, the thermometer 100 and the smartphone 200 set a new subsequent session.

The thermometer 100 sets a plurality of session keys (k11/k12) to use in a first session (Session 1) (410). The plurality of session keys (k11/k12) may be generated in the thermometer 100 or in the smartphone 200 that has respectively many resources.

The thermometer 100 performs a secured data communication 420 through an opened session. The thermometer 100 performs a communication 421 of transmitting E1 which is generated by encrypting the first data (data_1) including the initially-sensed temperature after the first session as the session key (k11). After then, the thermometer 100 periodically measures temperature and determines how much it is increased or decreased by comparing a temperature with a temperature which was measured right before the temperature was measured. The thermometer 100 encrypts difference data (diff_1, . . . , diff_n) that indicates an increased or decreased degree with the session key (k12) and performs communication (422, . . . , 423) which is periodically transmitting encrypted E2 until the first session (Session 1) ends.

When the session ends, the thermometer 100 and the smartphone 200 open a new subsequent session 430. Two session keys (k1$i$, k2$i$) are set in ith session (Session i).

The thermometer 100 performs a secured data communication 440 through the ith session. The thermometer 100 encrypts data (data_i) that was initially measured after the new session was opened as the session key (k1$i$) and transmits the data (data-i) to the smartphone 200 (441). Then, the thermometer 100 encrypts the difference data (diff_1, . . . , diff_n) that indicates increased or decreased degree from the measured temperature with the session key (k2$i$) and sequentially transmits the encrypted data to the smartphone 200 (442, . . . , 443).

In the example embodiments, function E1 (k, data) that was embodied by an encryption algorithm using the session key k1$i$ has higher computation and also a security level higher than function E2 (k, data) of the encryption algorithm using the session key (k2$i$).

After the smartphone 200 recognizes an initial temperature by decrypting the signal which was encrypted as E1 with the high security level, the smartphone 200 may have information of a current temperature by decrypting a signal that was encrypted as lightweight E2 and adding accumulated difference data (diff) that is decrypted.

Figure 5:
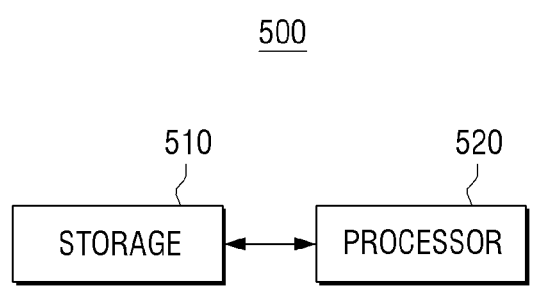
FIG. 5 is a block diagram illustrating an example configuration of an encrypting device according to an example embodiment.

FIG. 5 is a block diagram illustrating an example configuration of an encrypting device according to an example embodiment.

FIG. 5 illustrates that the data encryptions performed by the electronic device 100 according to FIGS. 1 to 4 are embodied as separate configurations. Referring to FIG. 5, the encrypting device 500 includes a storage 510 and a processor (e.g., including processing circuitry) 520.

The storage 510 stores a program in which a plurality of encryption algorithms having different security levels are embodied. The storage 510 stores a plurality of data pieces acquired from an external. The stored plurality of data pieces may be data pieces that indicate information having different confidentiality levels according to a random standard. In an example embodiment, a plurality of data pieces may include data initially acquired from a sensor and data for which data acquired later is processed based on initial data. The data processing may be a calculation that is performed according to a pre-set formula in which previous data and current data are variables. Extents of confidentiality of the plurality of data pieces may be assigned to each data pieces in a process of generating the plurality of data pieces. In addition, the encrypting device 500 itself may assign different confidentiality levels by classifying data into original data and processed data.

The storage 510 may be embodied in various storage means to store data. For example, the storage 510 may be embodied as at least one of a hard disk drive (HDD), a software design description (SDD), a flash memory, a portable memory device and a web-server that is connectable through network communication.

The processor 520 may include various processing circuitry that controls each element of the encrypting device 500. The processor 520 may encrypt the stored plurality of data pieces with different encryption algorithms based on an extent of confidentiality. For example, the processor 520 encrypts data that requires a high confidentiality level with an encryption algorithm that has a high security level due to high computation. However, the processor 520 encrypts data that requires a low confidentiality level with an encryption algorithm of which security level is low due to low computation.

The encrypting device 500 enables data security to be maintained with few resources.

Figure 6:
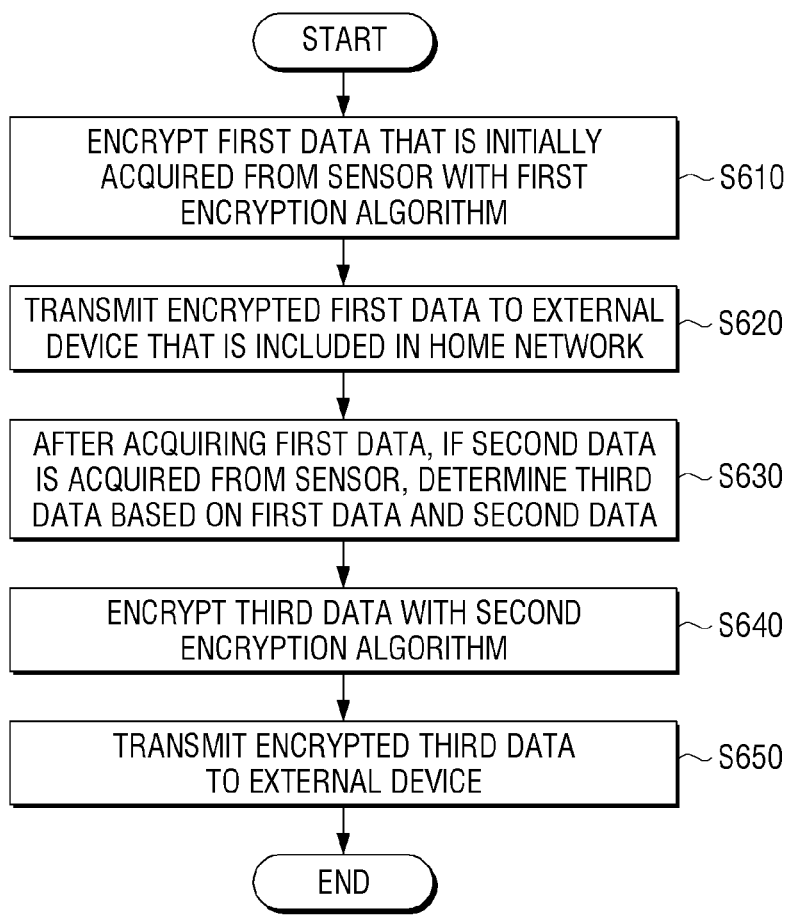
FIG. 6 is a flowchart illustrating an example method of communication of an electronic device according to an example embodiment.

FIG. 6 is a flowchart illustrating an example communication method of an electronic device according to an example embodiment.

Referring to FIG. 6, first data that is initially acquired from a sensor is encrypted with a first encryption algorithm (S610). For example, the electronic device may process a signal sensed by a sensor as information and encrypt data of the initially acquired information with the first encryption algorithm. The first encryption algorithm may be a heavyweight encryption algorithm.

Next, the encrypted first data is transmitted to an external device included a home network (S620). For example, the electronic device may transmit the first data including entire information sensed from the sensor to the external device that is present on the home network.

If second data is acquired from the sensor after the first data is acquired, third data is determined based on the first data and the second data (S630). For example, after first data is initially acquired, if the subsequent second data is acquired from a sensor, the electronic device may determine third data from which the second data can be derived based on the first data according to a pre-set formula. Even though the third data itself does not include entire information, the third data may be data that was more lightened than the second data. In an example embodiment, the third data may be data that is lossy compressed with compressing technology such as a codec.

The third data may be data indicating a result of differentiation between the second data and the first data. For example, the third data may only include a difference of an option that has been differentiated from the option in the later second data among a plurality of options included in the first data. Also, the third data may indicate a non-identical matter between the second data and the first data.

The third data may be encrypted with a second encryption algorithm (S640). For example, the electronic device may encrypt the determined third data with the second encryption algorithm that is lighter than the first encryption algorithm.

The encrypted third data may be transmitted to an external device (S650). For example, the electronic device may transmit the lightly encrypted third data to the external device. If the electronic device communicates with the external device wirelessly, the electronic device may encrypt the third data that is periodically acquired and determined while a session for wireless communication is maintained with a stream encryption and transmit the encrypted data to the external device.

The communication method enables efficient secured communication in the electronic device that has not many resources. Also, the communication method may be embodied in the resource-poor device or the electronic device 100 of the example embodiments of FIGS. 1 to 4, and may also be embodied in different devices by which communication is capable.

Figure 7:
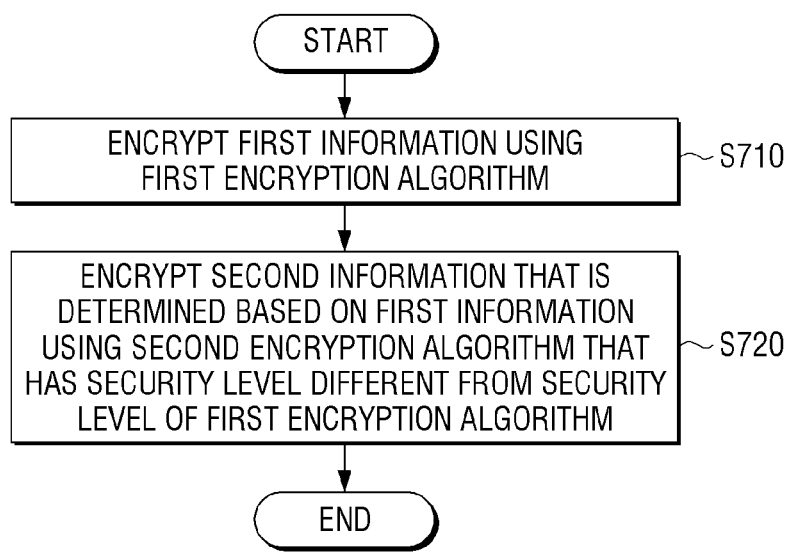
FIG. 7 is a flowchart illustrating an example encrypting method according to an example embodiment.

FIG. 7 is a flowchart illustrating an example encrypting method according to an example embodiment.

Referring to FIG. 7, first information is encrypted with a first encryption algorithm (S710). For example, an encrypting device may encrypt the first information among a plurality of pieces of information of different kinds with the first encryption algorithm. The first information may be determined by extents of confidentiality of the plurality of information pieces being compared. In an example embodiment, the first information is initially acquired information that may become a criterion.

Second information determined based on the first information is encrypted using a second encryption algorithm that has a security level different from a security level of the first encryption algorithm (S720). Specifically, an encrypting device may encrypt the second information with the second encryption algorithm by classifying the second information determined based on the first information. A low extent of confidentiality may be assigned to the second information determined based the first information according to a pre-set criterion. Also, the encrypting device may encrypt the second information that has a low extent of confidentiality with the second algorithm that has the low security level.

The second information may be information that is acquired after the first information is acquired. Also, the second encryption algorithm of the low security level may require less computation than the first encryption algorithm in encrypting certain information.

The encrypting method of the example embodiment enables security to be maintained with efficient resource use in a device that has few resources. Also, the encrypting method may be embodied in all devices that require information security in addition to the encrypting device of FIG. 5.

Meanwhile, the example embodiments are explained in assumption that all elements are combined in one or operate by being combined but the disclosure is not limited thereto. In other words, in the scope of the disclosure, all elements may operate by selectively being combined in at least one. Also, all elements may respectively be embodied in at least one piece of independent hardware; however, some parts or all parts of each element may be selectively combined to be embodied as a computer program that has a program module performing all functions of some or all combined in a piece of hardware or a plurality of hardware pieces. Codes and code segments that compose the computer program may be easily deduced by people having ordinary skill in the art to which the disclosure pertains (herein after referred to as "those skilled in the art"). These computer programs may realize the example embodiments by being stored in a non-transitory computer readable media that a computer can read and by being executed.

A non-transitory computer readable medium is a medium that stores data and from which data is readable by a device. For example, the programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

Although the example embodiments of the disclosure have been illustrated and described hereinabove, the disclosure is not limited to the above-mentioned example embodiments, but may be variously modified by those skilled in the art to which the disclosure pertains without departing from the scope and spirit of the disclosure as set forth in the accompanying claims.

What is claimed is:

1. An electronic device included in a network, the device comprising:
   a sensor;
   a communicator comprising communication circuitry configured to communicate with an external device which is included in the home network; and
   a processor configured to:
      set a session for communicating with the external device and a plurality of encryption keys to be used during the session,
      encrypt first data acquired from the sensor using a first encryption key corresponding to a first encryption algorithm from among the plurality of encryption keys,
      control the communicator to transmit the encrypted first data to the external device,
      in response to second data being acquired from sensor after the first data is acquired, acquire third data based on the first data and second data,
      encrypt the third data using a second encryption key corresponding to a second encryption algorithm from mong the plurality of encryption keys, and control the communicator transmit the encrypted third data to the external device.

2. The device as claimed in claim 1, wherein the second encryption algorithm requires less computation to encrypt certain data than the first algorithm.

3. The device as claimed in claim 1, wherein the processor is further configured to share a plurality of encryption keys to be used until the set session ends.

4. The device as claimed in claim 3, wherein the first encryption. algorithm comprises a block encryption algorithm using an encryption key shared during the session, and the second encryption algorithm comprises a stream encryption algorithm using an encryption key shared during the session.

5. The device as claimed in claim 3, wherein the first encryption algorithm comprises an asymmetric key encryption algorithm using a public key shared during the session, and the second encryption algorithm comprises a symmetric key encryption algorithm using a secret key shared during the session.

6. The device as claimed in claim 1, wherein the processor is configured to encrypt the third data that indicates a difference between the first data and the second data based on the second encryption algorithm.

7. The device as claimed in claim 1, wherein the processor is configured to, in response to the first data and the second data not being identical, encrypt the third data that indicates that the first data and the second data are not identical based on the second encryption algorithm.

8. A communication method of an electronic device which is included in a network, the method comprising:
   setting a session for communicating with an external device and a plurality of encryption keys to be used during the session;
   encrypting first data acquired from a sensor using a first encryption key corresponding to a first encryption algorithm from among the plurality of encryption keys;
   transmitting the encrypted first data to the external device included in the network;
   in response to second data being acquired from the sensor after the first data is acquired, acquiring third data based on the first data and second data encrypting the third data using a second encryption key corresponding to a second encryption algorithm among the plurality of encryption keys; and transmitting the encrypted third data to the external device.

9. The method as claimed in claim 8, wherein the second encryption algorithm requires less computation to encrypt certain data than the first algorithm.

10. The method as claimed in claim 8, further comprising: sharing a plurality of encryption keys to be used until the set session ends.

11. The method as claimed in claim 10, wherein the first encryption algorithm comprises a block encryption algorithm using an encryption key shared during the session, and the second encryption algorithm generates a pseudorandom number using an encryption key shared during the session as a seed value and comprises a stream encryption algorithm using the generated pseudorandom number.

12. The method as claimed in claim 10, wherein the first encryption algorithm comprises an asymmetric key encryption algorithm using a public key shared during the session, and the second encryption algorithm comprises a symmetric key encryption algorithm using a secret key shared during the session.

13. The method as claimed in claim 8, wherein the acquiring the third data comprises acquiring the third data that indicates a difference between the first data and the second data.

14. The method as claimed in claim 8, wherein the acquiring the third data comprises, in response to the first data and the second data not being identical, acquiring the third data that indicates that the first data and the second data are not identical.

15. An encrypting method comprising:

setting a session for communicating with an external device and a plurality of encryption keys to be used during the session;

encrypting first information using a first encryption key corresponding to a first encryption algorithm among the plurality of encryption keys; and encrypting second information determined based on the first information using a second encryption key corresponding to a second encryption algorithm among the plurality of encryption keys, wherein a security level of the second encryption algorithm is different from a security level of the first encryption algorithm.

16. The method as claimed in claim 15, wherein the second information is a result of differentiation between the first information and information acquired later than the first information.

17. The method as claimed in claim 15, wherein the second encryption algorithm requires less computation to encrypt certain data than the first algorithm.

* * * * *